June 28, 1960 C. E. JONES 2,943,214
CONTROL APPARATUS
Filed Aug. 14, 1958 6 Sheets-Sheet 1

Inventor
Charles E. Jones
By
Pennie, Edmonds, Morton, Barrows & Taylor
Attorneys June 28, 1960 C. E. JONES 2,943,214
CONTROL APPARATUS
Filed Aug. 14, 1958 6 Sheets-Sheet 6
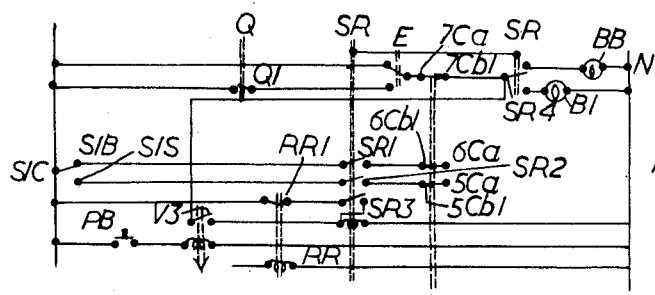
FIG. 6.
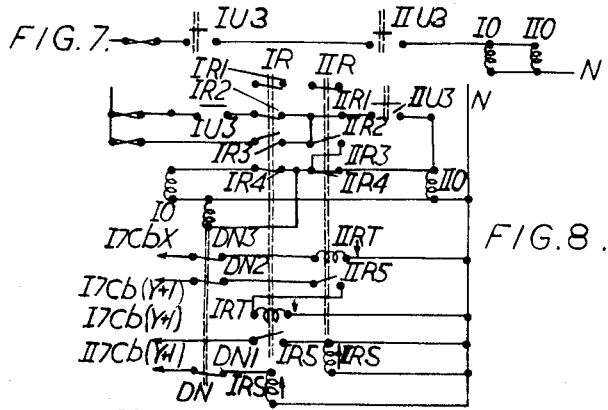
FIG. 7.
FIG. 8.
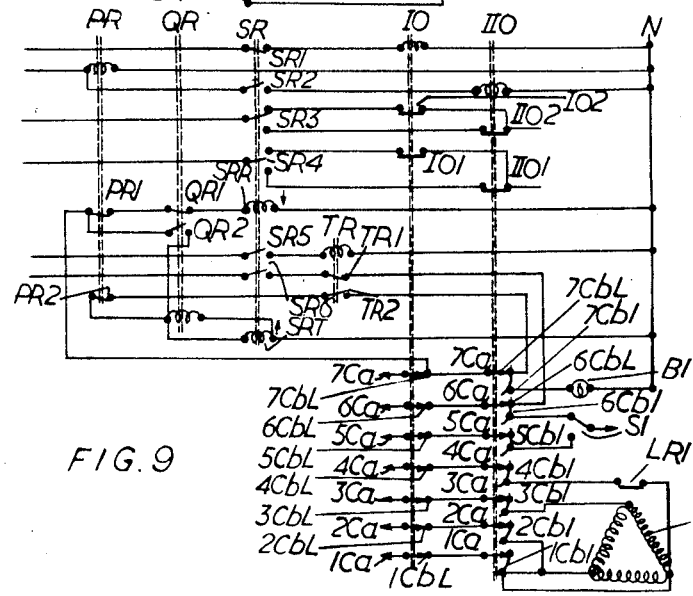
FIG. 9
Inventor
Charles E. Jones
By
Pennie, Edmonds, Morton, Barrows & Taylor
Attorneys

2,943,214
CONTROL APPARATUS

Charles E. Jones, Bradford, England, assignor to Jones, Tate & Co., Bradford, England, a British company Filed Aug. 14, 1958, Ser. No. 754,952

Claims priority, application Great Britain Aug. 28, 1957

21 Claims. (Cl. 307—115)

This invention relates to sootblowers, and is especially concerned with the provision of means for controlling the sequential operation by electric motors of a series of sootblowers.

In the past, the apparatus that has been used for operating a group of sootblowers in some desired order has been such that each sootblower has had to be provided with control equipment that is practically a replica of the entire control equipment provided for each other sootblower and very few components have been common to all the control equipments.

The present invention provides apparatus for controlling the operation of several sootblowers in a series and each driven by an electric motor, the apparatus including means whereby each motor is connected as required to a mains power supply through a common mains switch.

In this way only one heavy duty switch is provided for all the sootblowers and as this is an important and expensive component considerable economy is effected.

To enable the sootblower control circuits to be connected as required to the mains switch a distributor is used and the arrangement is such that whilst the mains switch is on open circuit the distributor is moved from one position to the next to disconnect one sootblower control circuit and connect in the next and this operation of the distributor can be arranged to be automatic so that once the sequence of operations has started, it will continue without attention. The operation of the distributor from one position to the next can be effected by pulses produced at the beginning and end of the motions of the sootblowers.

Two-position switches may be provided for each position of the distributor to determine whether a sootblower associated with that position is to be operated or not. If the switch is in such a position that the sootblower is to be by-passed, the distributor is moved by the circuit provided to its next position. If the switch is in such a position that the sootblower is to be operated, the sootblower operates and the distributor is then moved to its next position by the circuit provided. Means such as a two-step relay may be included in the circuit to ensure that if the switch is moved to the "by-pass" position before the operation of the sootblower has been completed, the distributor will not move to its next position until the sootblower has reached its next position.

By means of the distributor it is possible to use several components of the apparatus for the control of all the sootblowers and for this purpose the common components are connected to contacts on the distributor that are common to all the sootblowers and these contacts are connected in turn, at each position of the distributor, to components that are characteristic of the sootblower (such as the electric motor) or the position of the distributor (such as the two-position switches).

In one form of the distributor the contacts are arranged in pairs in rows and a pressure member connects the pairs of all the rows in turn. Each row corresponds to a position of the distributor. In one form of the distributor, the contacts are arranged in rings, the contacts on the rings being aligned along the length of the distributor, and a contact making device is arranged to be moved around the rings.

By way of example, embodiments of the invention will now be described, with reference to the accompanying drawings, in which:

Figure 6 shows how the circuit shown in Figure 5 can be modified to enable all the rows of contacts on the distributor to be used to control the operation of sootblowers;

Figure 7 illustrates how the circuit shown in Figure 5 can be modified and associated with a similar circuit to enable each circuit to control a series of sootblowers so that the sootblowers in each series operate simultaneously;

Figure 8 illustrates how the modification shown in Figure 7 can be adapted to allow some of the sootblowers in each series to be operated singly whilst the sootblowers of the other series are inoperative; and Figure 9 illustrates how it is possible to pass automatically from one distributor to the next if more rows of contacts than can be incorporated on one distributor are required.

Figure 1:
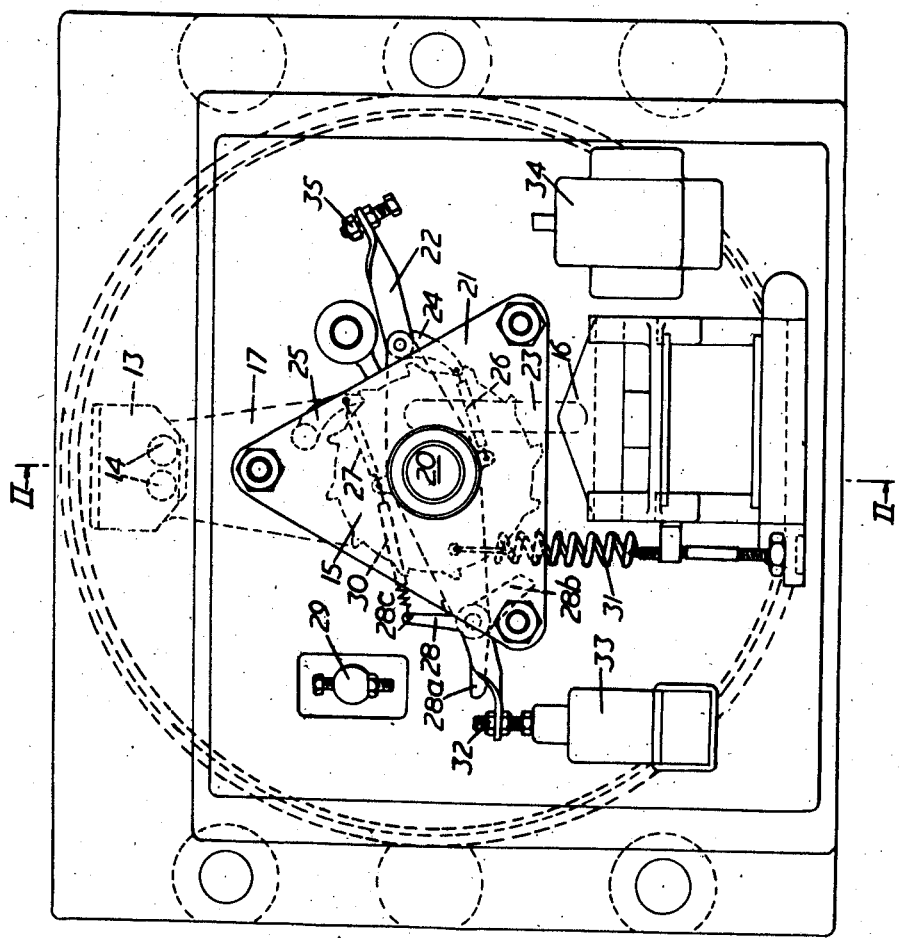
Figure 1 shows in end view a distributor by means of which a plurality of sootblowers can be connected into circuit successively.
Figure 2:
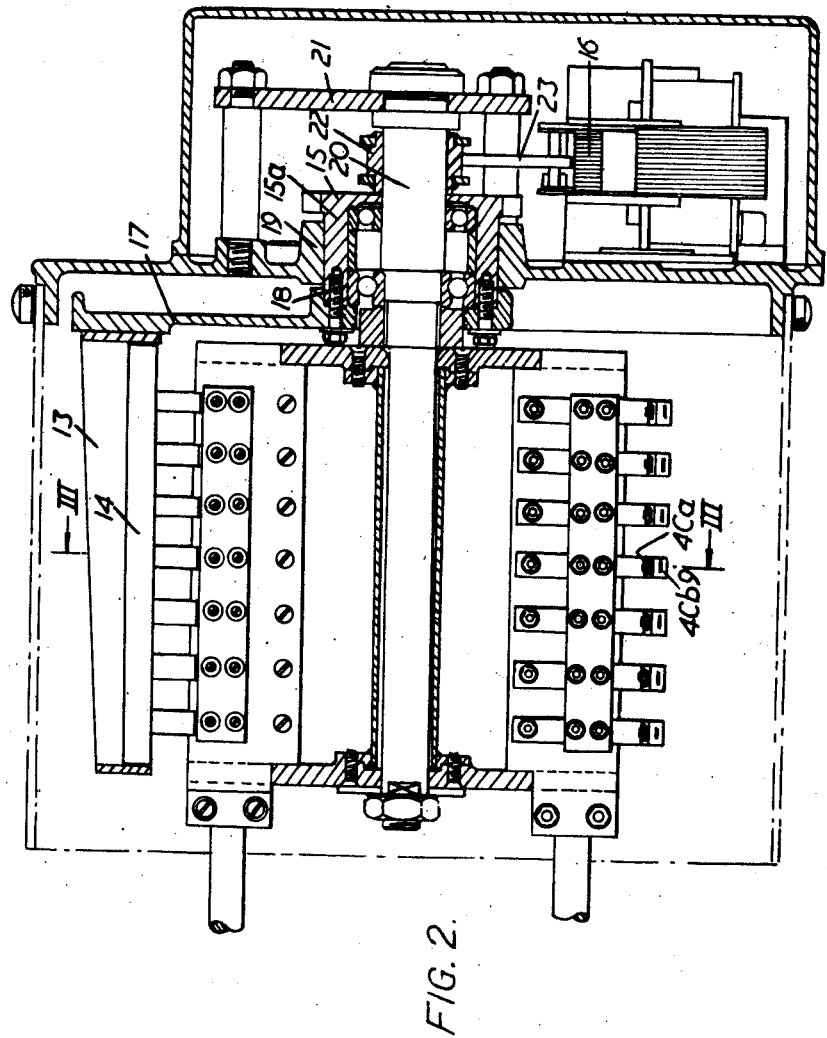
Figure 2 is a section on the line II—II of Figure 1.
Figure 3:
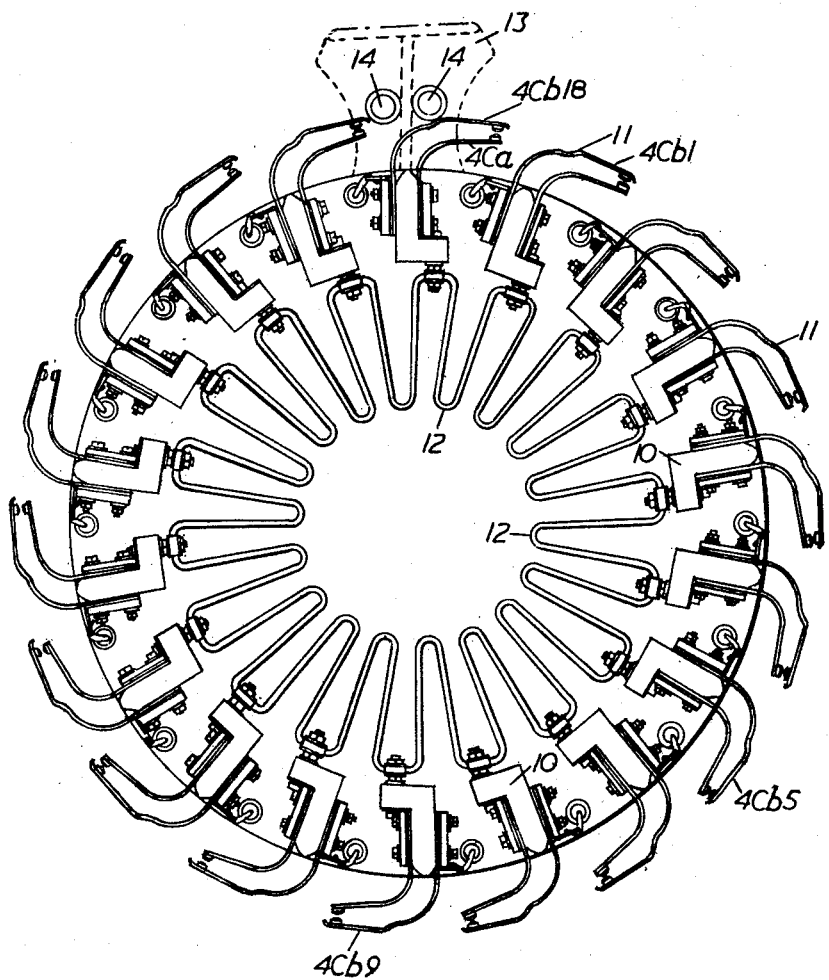
Figure 3 is a section on the line III—III of Figure 2.

The distributor shown in Figures 1 to 3 comprises seven circles of pairs of contacts and in the embodiment illustrated there are eighteen pairs of contacts on each circle. The contacts are mounted in fixed positions on the distributor and are aligned along the length of the distributor. Each pair of contacts consists of two arms of spring steel mounted on a block 10. The contacts extend radially outwardly for part of their length and are then bent to extend circumferentially one outside the other in a clockwise direction. Throughout the specification the contacts will be specified by the ring in which they lie, whether they are the outer or the inner contact of a pair and the row in which they lie. Thus a contact referred to as 4Cb9 lies in ring number 4, is the outermost contact of the two and lies in the ninth row of contacts. All the inner contacts of each ring are connected together as shown at 12 in Figure 3 so that it is unnecessary to stipulate the row in which any of the inner contacts lies and 4Ca, for instance, indicates the commoned contacts of the fourth ring.

The outer arms $b$ are humped as at 11. The inner arms $a$ of each pair of contacts in a ring are connected together by the loops 12 which facilitate removal of the blocks 10 for inspection.

A pressure bar 13 is provided to close all the contacts of any row simultaneously. It comprises two parallel rollers 14 extending the length of the seven rings of contacts and is such that when in the contact making position the humps 11 lie between the rollers 14. The humps thus serve positively to position the rollers 14 relatively to the contacts. Moreover, in coming to the contact making position the rollers 14 depress the humps 11 so causing the tips of the contact arms to slide over each other and thereby clean each other.

To move the pressure arm 13 from one row of contacts to the next the ratchet 15 shown most clearly in Figure 1 is used. The ratchet 15 is rigidly connected by means of the screws 18 to arm 17 from which the rollers 14 extend perpendicularly. The stud 15a of the ratchet 15 is mounted to rotate within a bush 19 on the spindle 20. The spindle 20 is co-axial with the rings of contacts and is supported at its outer end by the fixed member 21.

The ratchet 15 is rotated by means of the operating solenoid 16 through the bar 22 which is rotatable on the spindle 20 and extends radially in opposite directions from the spindle beyond the circumference of the ratchet wheel.

The operating solenoid 16 moves the bar 22 through the movable link 23 and on energization of the solenoid 16 the link 23 moves the bar in a clockwise direction. Pawl 24, pivoted to the bar 22, engages behind a tooth of the ratchet 15 and so moves it forward in a clockwise direction. The pressure bar being rigidly connected to the ratchet 15 also moves in a clockwise direction and it is arranged that the movement produced by the solenoid 16 is such as to move the pressure bar from one row of contacts to the next. To prevent the possibility of rotation of the ratchet 15 in an anticlockwise direction pawl 25 pivoted to the fixed member 21 is provided. Both pawls 24 and 25 are urged to their tooth-engaging positions by springs 26 and 27 respectively.

Since considerable momentum is acquired by the moving parts of the apparatus when the pressure bar moves from one row of contacts to the next, there is a danger that the pressure bar 13 may overshoot the row of contacts to which it is moved. To prevent this, the member 28 having three radially extending limbs is provided. When the ratchet 15 has reached the position in which the pressure bar 13 lies on the next row of contacts, limb 28a engages the fixed stop 29 so that any tendency of the bar 22 to rotate further in the clockwise direction will bring the limb 28b into contact with a tooth of the ratchet and so prevent further movement. Spring 30 is connected to limb 28c to disengage prong 28b from the ratchet.

Spring 31 is provided to return the bar 22 to the position shown in the drawing after the operating solenoid 16 has been de-energised.

When the bar 22 is in the condition shown in the drawing it closes through member 32 the contacts of heavy duty switch 33. These contacts are used as will be described later to close the circuit through which soot blower operating motors are driven and this circuit can also be opened by opening the contacts on the distributor when the pressure bar moves from one row to the next. Since switch 32, however, always opens before the contacts on the distributor are opened, it is ensured that the current to the motor is never interrupted by the comparatively light duty contacts on the distributor.

Switch 34 is a time delayed switch which is normally closed and which as will be described later serves to isolate the solenoid 16 when it is opened. It is opened by means of the member 35 as the bar 22 approaches the end of its movement and due to its delay remains open over a predetermined time after the solenoid 16 has been de-energised. It thus ensures that successive movements of the pressure bar 13 cannot occur without an adequate time delay between them.

Figure 4:
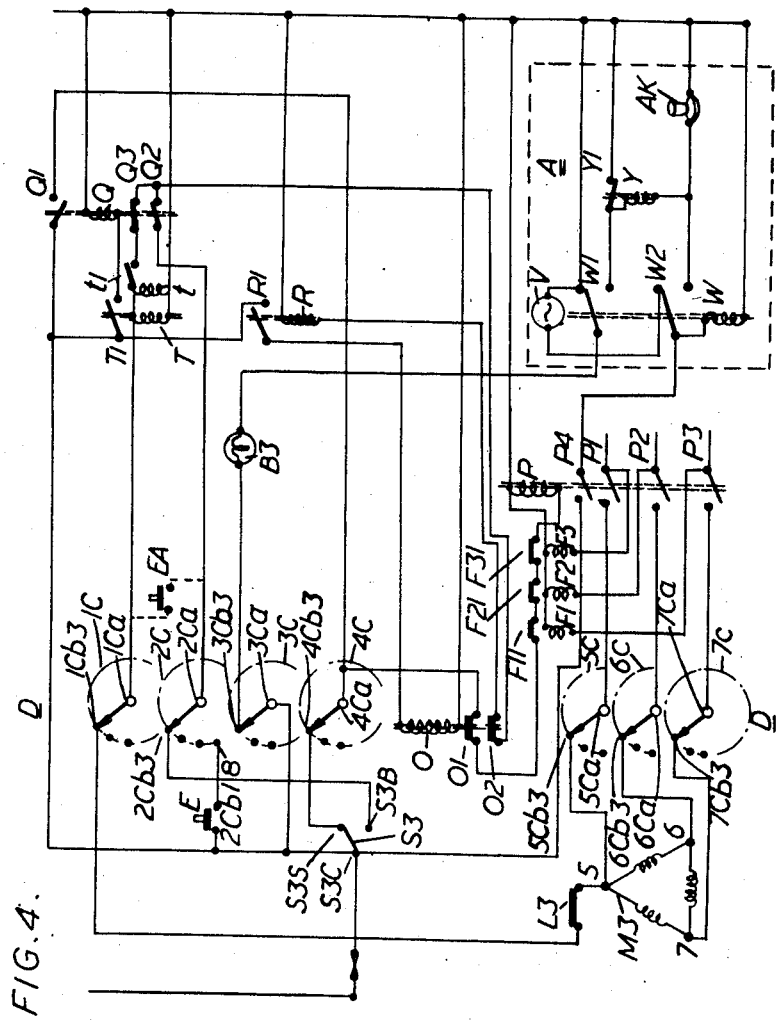
Figure 4 shows a circuit arrangement incorporating a distributor as illustrated in Figures 1 to 3 for controlling the operation of a plurality of unidirectional sootblowers.

Figure 4 illustrates an embodiment of the invention in which a distributor such as is illustrated in Figures 1 to 3 is used to control the sequential operation of seventeen unidirectional or rotary sootblowers. These are not shown in the drawings but are of conventional type. Each is driven by a delta-connected three-phase motor. A limit switch, which is also of known type, is used to produce signals indicating the beginning and end of the movement of a sootblower.

In the apparatus illustrated each sootblower (number $n$ in the operating sequence) is provided with its own motor $Mn$, its own two-position sequence switch $Sn$ whose condition determines whether the sootblower $n$ is to be operated in sequence or by-passed, its own indicating lamp $Bn$ which indicates whether the sootblower is operating at any particular moment and its own limit switch $Ln$. The limit switches are of known type and arranged to supply a current whilst the sootblower is traversing a shot length of its path. The other components shown in Figure 4 are common to all the sootblowers. The distributor D is provided with eighteen rows of contacts, one being appropriate to each sootblower and the last row C18 being the position to which the pressure bar returns when the sequence of operations of the sootblowers has been completed. For the sake of clarity the distributor D is shown diagrammatically, the rings of contacts 1C, 2C etc. being shown one above the next whilst the operating solenoid (corresponding to 16 of Figures 1 to 3) is shown at O. The circuit shown particularly in the drawing is in the condition at which operation of sootblower No. 3 is instigated but is typical of the circuit used for the other sootblowers.

In this circuit, the sequence switch S3 has a common terminal S3C which is connected to the power line and through contacts Q1 on relay Q to the commoned contacts 4Ca of ring 4 of the contacts on the distributor. These contacts are also connected through contacts O1 of a relay incorporating the operating solenoid O and through the solenoid of a main power contactor relay P to neutral. Contacts O1 (corresponding to switch 33 of Figures 1 to 3) are arranged to open immediately energising current flows to the solenoid O and close when the solenoid is de-energised. The sequence terminal S3S of the sequence switch S3, which must be connected to the common terminal S3C if sootblower No. 3 is to operate, is connected to contact 4Cb3 of the distributor. The "by-pass" terminal S3B of the sequence switch S3, which will be connected to the common terminal S3C if sootblower No. 3 is to be by-passed and not operated, is connected to contact 2Cb3 of the distributor D. The commoned contacts 2Ca of this ring are connected through contacts Q2 and contacts O2 in series to a time delayed relay coil R and so to neutral. Relay R has contacts R1 and is such that the contacts remain closed for a short period after the energising current has been removed from the coil R. The contacts R1 are included in a lead by which the solenoid O is connected to the lower line, the other side of the solenoid O being connected to neutral. The contacts O2 through which energising current passes to the relay R correspond to switch 34 in Figure 2 and are arranged to open when the solenoid O approaches its fully energised position and remain open for a predetermined period after the solenoid has been de-energised to ensure that the solenoid O cannot be re-energised too quickly after being de-energised. In the circuit shown, contacts 3Ca are all connected to the power line and contacts 3Cb3 are connected through an indicating lamp B3 and an alarm device A, which will be described in more detail later, to neutral.

The apices 5, 6 and 7 of the motor M3 are connected to contacts 5Cb3, 6Cb3 and 7Cb3 respectively whilst contacts 5Ca, 6Ca and 7Ca are connected through the contacts P1, P2 and P3 respectively of the main power contactor relay P to the three phases of the power supply.

One side of the limit switch L3 is also connected to contact 5Cb3 so as to be activated when the motor is energised. The other side of the limit switch L3 is connected to contacts 1Cb3 on the distributor D. Contacts 1Ca are connected through the parallel connected solenoids of two-step relay T and protective relay $t$ to neutral. Relay coils T and $t$ are energised by current passed by the limit switch L3. When one impulse of current is supplied by the limit switch L3 to relay coil T, contacts T1 close until the next impulse of current is supplied by the limit switch when the contacts open. Contacts $t$1, however, remain closed only for the duration of the impulse and re-open immediately the impulse ceases. When relay coil T is energised, contacts T1 close so that relay coil Q is energised to close contacts Q1 and open contacts Q2 and Q3.

Switches F11, F21 and F31 are included in the lead between contacts O1 and the main power contactor coil P. Each switch is controlled by a relay coil, F1, F2 and F3 respectively, which remain energised provided there is no fault in any of the three phases of the mains supply. The occurrence of a fault de-energises one of the coils and opens the corresponding switch so that the coil P cannot become energised.

The circuit so far described is typical of all the circuits associated with all the rows of contacts C1 to C17. Of the contacts in row 18, the row along which the pressure bar lies on the completion of one sequence and before the initiation of the next, only 2C18 are used. Contact 2$Ca$18 is common with the other contacts 2$Ca$, whilst contact 2$Cb$18 is connected through an initiator push button switch E to the power line.

Now suppose the pressure bar lies along contacts C18 and the sequence is to be inaugurated. The switch E is closed and so completes the circuit through Q2 and O2 to energise the relay coil R. This closes contacts R1 and so energises solenoid O which moves the pressure bar on the distributor to the contacts in row C1. Operation of solenoid O opens contacts O1 to disconnect the main power contactor coil P and subsequently opens contacts O2 to de-energise relay coil R. The time delay in this relay is sufficient to maintain contacts R1 closed for a time sufficient to ensure that the solenoid O completes the required movement of the pressure bar. Contacts R1 then open, de-energizing solenoid O and so allowing contacts O1 and subsequently O2 to close again.

If, when the pressure bar reaches contacts C1, the sequence switch S1 is in the by-pass position, i.e. contacts S1C and S1B are connected, the effect is the same as when the switch E was closed so that the pressure bar moves on to contacts C2. If sequence switch S2 is also in the by-pass position, the pressure bar will move on to the row of contacts C3 and if, as shown, sequence switch S3 is in the sequence position all the circuit shown in Figure 4 will be used, although the alarm circuit A will not operate if no fault occurs.

Assuming that there are no faults in the main supply, switches F11, F21 and F31 will be energised through O1. This will close contacts P1 to P4 and set the motor M3 in motion to drive the sootblower. Commencement of this motion will provide the first operation of limit switch L3 and this will energise the relay coil T to close contacts T1 and retain them closed until the second operation of limit switch L3, which occurs at the end of the motion of sootblower. Coil $t$ will be energised simultaneously with coil T and contacts $t$1 will remain closed for as long as $t$ is energised i.e. for as long as a current is supplied by limit switch L3.

Energisation of coil T closes contacts T1 immediately, thereby energising coil Q and so closing contacts Q1 and opening contacts Q2 and Q3. Thus although contacts $t$1 are closed, no current can pass through them to the relay coil R since contacts Q2 and Q3 are open. Closure of contacts Q1 provides a route for current to the main power contactor alternative to that through the switch S3 so that even if this switch is accidentally adjusted to the "by-pass" condition during operation of the sootblower, the operation of the sootblower will continue through this alternative route. In addition, since contacts Q2 are broken, the circuit through the ring of contacts 2C will not be completed.

Now when the sootblower reaches the end of its motion the limit switch causes another current to be applied to relay coil T and $t$ which opens contacts T1 and holds contacts $t$1 closed for the duration of the impulse. Opening contacts T1 will de-energise relay coil Q, so releasing the holding contacts Q1 and closing the contacts Q2 and Q3. Since contacts $t$1 are closed for the duration of the pulse from the limit switch L3, a current will pass through contacts Q3 to energise relay coil R and the sequence described when the push button E is closed will be completed. The immediate effect of the energising current flowing to solenoid O will be to open contacts O1 so that the current to the coil P will be broken and consequently the power switches P1 to P4 will be broken before the solenoid O has become effective to rotate the pressure arm on the distributor. The heavy duty switching will therefore occur at the switches P1 to P4 rather than at the contacts on the distributor.

The alarm circuit A comprises an automatic timing device including a synchronous motor V and a solenoid W, the solenoid W controlling switches W1 and W2 and a pre-set timing disc. Operation of the solenoid connects the timing disc to the motor and at the end of the period for which the disc is set unless the solenoid is previously de-energised, it will operate the contacts W1 and W2 to the alternative conditions to those in which they are shown in Figure 4. When W1 is in the condition shown, the indicating lamp B3 is connected directly to neutral. When it is in the other condition, the lamp B3 is connected to neutral through the contacts Y1 of the flasher relay coil Y. When W2 is in the condition shown the synchronous motor V is connected on one side through contacts P4 to the power supply and on the other side to neutral. When W2 is in its other condition, the motor V is disconnected and the audible alarm AK is connected to neutral on one side and through P4 to the power supply.

When the main power contactor is energised, contact P4 will close, current will pass through W2 to the motor V which will be set in operation for a period determined by the timing disc to be slightly greater than that required for the normal operation of a sootblower. Lamp B3 will light through W1. If the sootblower completes its operation normally, P4 will open to de-energise the motor V and the solenoid W and reset the timing disc to zero. If, on the other hand, the sootblower does not complete its operation within the time for which the timing disc is set, the disc throws the switches to the alternative conditions to those in which they are shown in the drawing. This will cause current to flow through the audible alarm AK and the flasher relay Y and will connect the indicator lamp B3 to neutral through contacts Y1. The intermittent opening and closing of Y1 will cause lamp B3 to flash and give a visual indication of alarm conditions. Once a fault has been indicated, sequence switch S3 may be turned to its "bypass" condition and an auxiliary push button EA is depressed. This will provide artificially the second impulse that should have come from limit switch L3 and so move the pressure bar of the distributor on to the next row of contacts, contacts P4 will open due to the de-energisation of main power contactor P, current to the alarm A will be cut off and the alarm will return to its normal or inoperative condition.

It will be seen that if for any reason the power supply is cut off and then restarted, the apparatus will recommence operation from the condition it was in when the supply was cut off.

The apparatus described can readily be adapted to operate reciprocating sootblowers, one row of contacts on the distributor controlling the outward movement and the next row controlling the return movement.

A further limit switch is provided for this purpose in parallel with L3 and arranged to operate when the sootblower is in its outermost condition. Motor M3 drives the sootblower in both directions, but when the pressure bar closes contacts C4, pole 6 of the motor M3 is connected to contact 7$Cb$3 and pole 7 of the motor M3 is connected to contact 6$Cb$3. The second impulse required to open contacts T1 comes from the second limit switch as the sootblower reaches the end of its outward motion and so opens main power contactor P and moves the pressure bar to close contacts C4 of the distributor. In this condition, the motor M3 operates in the reverse direction and retracts the sootblower. The first impulse to close contacts T1 comes from the limit switch in parallel with L3 and the second impulse which opens the contacts T1 and eventually moves the pressure bar to C5 comes from limit switch L3.

Figure 5:
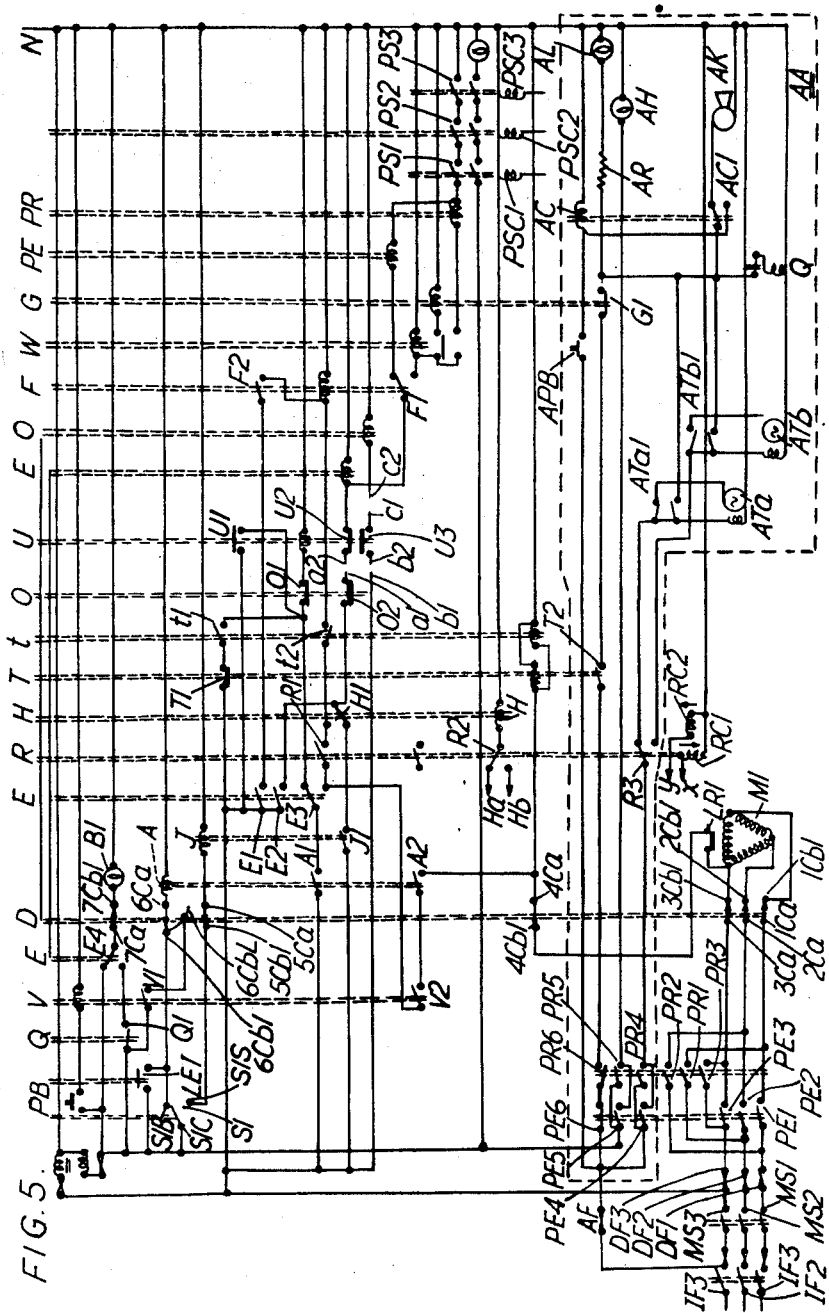
Figure 5 shows a circuit arrangement incorporating a distributor as illustrated in Figures 1 to 3 for controlling the operation of a plurality of reciprocating sootblowers, the outward and return movement of each sootblower being controlled through only one row of contacts on the distributor.

Another embodiment of the invention incorporating a distributor such as is illustrated in Figures 1 to 3 is shown in Figure 5. The reference numerals used in this figure do not necessarily correspond with those used in Figure 4 and the whole circuit, including the distributor D is shown in a more diagrammatic form.

The circuit shown in Figure 5 is used for controlling the operation of reciprocating sootblowers (of conventional kind, not shown) and both the outward and return motion of each sootblower is controlled from one row of contacts on the distributor D. Two limit switches are provided on each sootblower to generate impulses or currents of short duration at the beginning and end of the movement of the sootblower in each direction. One motor is used to drive the sootblower in both directions and a relay employed in turn for all the motors is used to reverse the direction of operation of the motor.

There is one more row of contacts on the distributor D than sootblowers to be controlled, the last row of contacts CL serving as a rest position for the pressure bar before and after the sequence of operations has been completed.

Each sootblower (number $n$, for instance) is provided with its own motor M$n$, its own operating indicator lamp B$n$, two limit switches—LR$n$ which provides impulses when the sootblower is at or near its retracted position and LE$n$ which provides impulses when the sootblower is near its extended position—and its own sequence position switch S1. The other components shown in the drawings are common to all the sootblowers. In the drawing the pressure bar of the distributor is closing the contacts in row C1.

For the simple sequential operation of a plurality of retractable sootblowers it is to be assumed that the circuits are permanently made across $a1$ and $a2$, $b1$ and $b2$, and $c1$ and $c2$ and that the relay R having the two coils RC1 and RC2 is excluded from the circuit, and contacts R1 are closed. It is also to be assumed that contacts H1 are permanently in the condition shown and that coil H is excluded. The purpose of these components will be explained later.

The common terminal S1C of the switch S1 is connected to a power line. The terminal S1B, to which terminal S1C must be joined if the sootblower 1 is to be by-passed, is connected to contacts 6C$b1$ of the distributor D and the commoned contacts 6C$a$ of ring 6 are connected to neutral through relay coil A which controls contacts A1 and A2.

Terminal S1S of the sequence position switch S1, which must be connected to terminal S1C if sootblower 1 is to be operated, is connected to contact 5C$b1$ of distributor D and the commoned contacts 5C$a$ of the ring 5 are connected to neutral through relay coil J controlling contacts J1.

Comoned contacts 7C$a$ of the distributor D are connected through contacts E4 controlled by relay coil E to the power line. When contacts E4 are in the position indicated, no sootblower is operating and the connection to the power line is direct. When a sootblower is operating contacts E4 are thrown to their second position so that contact 7C$a$ is connected to the power line through contacts Q1 which, as will be explained later, are arranged to open and close rapidly should a fault occur in the equipment. Contact 7C$b1$ on the distributor is connected to neutral through the indicator lamp B1. This will glow steadily during the operation of sootblower 1 if no fault occurs but will flash due to the intermittent closure of contacts Q1, in fault conditions.

Contact 4C$b1$ is connected to the limit switch LR1 which is connected on the other side to one terminal of the delta-connected three-phase motor M1 so as to be energised when the motor M1 is energised. Commoned contacts 4C$a$ are connected through the two-step relay coil T and the protective relay coil $t$, which are in parallel with each other, to neutral. The coils T and $t$ control contacts T1 and T2 and $t1$ and $t2$ respectively. Contacts T1 and T2 are such that they will stay in the position to which they are switched by the arrival of one impulse at the coil until the arrival of the next subsequent impulse. Contacts $t1$ and $t2$ remain in their switched position only for the duration of the impulse.

Contacts 1C$a1$, 2C$a1$ and 3C$a1$ of the distributor are connected respectively to the terminals of motor M1 and the corresponding commoned contacts 1C$b$, 2C$b$ and 3C$b$ are respectively connected through switches PE1, PE2, and PE3 to distribution fuses DF1, DF2 and DF3 respectively, mains switches MS1, MS2 and MS3 respectively and isolating switch fuses IF1, IF2 and IF3 respectively at the three phases of the mains supply.

Switches PE1, PE2 and PE3 are arranged to be closed when main power contactor coil PE is energised and open when energisation of this coil ceases. Closure of these switches will cause the motor to be driven in one direction and so extend the sootblower. Further similar switches PR1, PR2 and PR3 are arranged across switches PE1, PE2 and PE3 and it is arranged that these additional switches will be closed when main power contactor coil PR is energised and open when the coil is de-energised. When these switches are closed and PE1, PE2 and PE3 are open the motor M1 will rotate in the reverse direction and so retract the sootblower. Coils PE and PR are, in addition, arranged to control additional contacts PE4, PE5 and PE6 and PR4, PR5 and PR6 respectively and these form part of an alarm apparatus AA which will be described fully later and which indicates the occurrence of certain faults in the equipment.

The solenoid O (corresponding to the solenoid 16 in Figures 1 and 2) by which the pressure bar is moved from one row of contacts on the distributor to the next is energised by closure of the contacts U3 of the time-delayed relay U. Solenoid O controls contacts O1 and O2 (corresponding to switches 34 and 33 respectively in Figure 1) which are arranged so that O2 opens immediately the energisation of solenoid O starts and O1 opens just as the solenoid O reaches its fully energised position i.e. just as the link controlled by the solenoid becomes fully extended and remains open for a predetermined time interval after the cessation of energisation.

Current for the energisation of the time-delayed relay U is supplied through contacts A1, E3 and O1. When the relay U is energised it closes contacts U1 and U3 and opens contact U2.

The main power contactor coil PE is connected to neutral through three phase switches PS1, PS2 and PS3 connected in series and controlled respectively by coils PSC1, PSC2 and PSC3 which remain energised, so that the switches PS1, PS2 and PS3 consequently remain closed, provided that no fault occurs in the three phases of the mains supply. One end of each coil PSC1, PSC2 and PSC3 is connected to neutral whilst the other ends are connected to the output sides of fuses DF1, DF2 and DF3 respectively. The other side of the power contactor coil PE is connected through contacts F1, U2, O2, H1, and J1 to the power supply. Contacts F1 form a two-position switch and when in the condition shown it disconnects the circuit containing the main power contactor coil PR. Contacts F1 are switched to their alternative position, as will be described when the sootblower reaches the end of its outward movement. When the contacts F1 are in their alternative position, contactor coil PE is disconnected and the circuit containing power contactor coil PR is connected to the power line through contacts U2, O2, and J1. The circuit containing coils PR, W and G are connected to neutral through switches PS1, PS2 and PS3. W is the coil of a time-delayed relay such that after energisation of the coil W, a time interval sufficient to ensure that the apparatus activated by energisation of coil PE has come to rest before coil PR is put into circuit.

Contacts F1 which connect either main power contactor coil PE or main power contactor coil PR to the main supply are controlled by relay coil F which is energised through contacts A1, E3, and t2. The coil also controls contacts F2 which when closed cause a holding current to be supplied to coil F through contacts E1.

Coil E is energised on closure of contacts J1 and in turn closes contacts E1, E2 and E4 and switches contacts E3 to their alternative position in which current can pass to the relay F. When contacts E1 are closed a holding current can pass to relay coil F; when contacts E2 are closed a holding current can pass to relay coil E.

The second limit switch LE1 is connected in parallel with the terminals S1C and S1B of the two position sequence switch S.

The circuit so far described is typical of the circuit provided for each sootblower. In addition a start and reset relay coil V is provided to initiate the cycle of operation and restart the cycle should either limit switch fail to supply the required impulse. The relay coil V is connected between the power line and the neutral and a push button switch PB is provided so that the connection is normally broken, and closed only when the switch is pressed. Energisation of coil V closes contacts V1 and V2. When contacts V1 are closed the power line is connected to contacts 6CbL to energise coil A at the start of the cycle. When contacts V2 are closed and the sequence switch is turned to its "by-pass" condition an impulse from contacts A1 via E3, V2 and A2 operates relays T and t to restart the sequence.

Now suppose the apparatus is at rest with the pressure arm lying along row of contacts CL. To start the cycle of operation, switch PB is depressed. This will energise V, close contacts V1 and through contacts 6CbL and 6Ca energise coil A. This will close contacts A1 so that the coil U of the time-delayed relay will be energised. This will close holding contacts U1 so that the coil will remain energised even through A1 opens as a result of releasing the push button PB. In addition contacts U3 will close causing operating solenoid O to become energised. This will immediately open contacts O2 so that had current been flowing to the main power contactor coils PE and PR (as is the case when the procedure now being described follows the operation of a sootblower) it would cease before contacts on the distributor D were opened. Full energisation of the solenoid O will move the pressure bar on to the row of contacts C1 and as the solenoid approaches full energisation contacts O1 will open. This will interrupt current to the coil U which due to its delay will retain contacts U3 closed for a time sufficient to ensure full energisation of the solenoid O. Contacts U3 will subsequently open and U2 close. Solenoid O will, therefore, be de-energised and contacts O1 and O2 will close again.

Now suppose when the pressure bar lies on contacts C1, sequence switch S1 were in the position shown in Figure 5, i.e. the "by-pass" position. Coil A would again be energised and the procedure whereby the pressure bar moves directly forward to contacts C2 without operating a sootblower would be completed again.

Suppose, however, that when the pressure bar lies on contacts C1, the sequence switch were in such a condition that contacts S1C and S1S were closed. An energising current would pass through relay coil J, closing contacts J1. Energising current would therefore pass through contacts H1, O2 and U2 to main power contactor coil PE which would close contacts PE1, PE2 and PE3 to start the motor M1 to drive the sootblower to its extended position. Simultaneously coil E would be energised closing contacts E1 and E2 and moving the contacts of switches E3 and E4 to their alternative positions. As a result, a holding current passes through contacts E2 to maintain the coils E and PE energised even though the selector switch S1 should be changed to its "by-pass" condition whilst the sootblower is operating.

As soon as the sootblower starts to move to its extended position, an impulse is generated by limit switch LR1 which energises coils T and t. This opens contacts T1 and closes contacts t1 so that the lead containing them remains broken. Relay T is such that T1 remains open until the relay T receives another impulse from limit switch LR1, but contacts t1 (and t2) remain closed only for the duration of the impulse. Contacts t2 being open whilst the impulse from LR1 persists prevents the coil F from being energised whilst the impulse lasts even though the sequence switch be turned to its "by-pass" condition after the sootblower operation has started.

Thus the conditions are such that the sootblower will proceed to the position of maximum outward extension. As it reaches this position, it operates the limit switch LE1 which energises coil A and so closes contacts A1. Current will therefore flow through these contacts, through E3 (which as a result of coil E being energised is now in the alternative position to that in which it is shown in the drawing) and so through the coil F. Energisation of this, throws the switch F1 to de-energise coil PE and release the switches PE1, PE2 and PE3. After a time delay determined by the relay W main power contactor coil PR will be energised and close the switches PR1, PR2 and PR3 so that the motor M1 is driven in the reverse direction. Energisation of coil F causes a holding current to pass through contacts F2 and E1 so that the coil F will remain energised even after the pulse from the limit switch LE1 has ceased.

Should the selector switch S1 be thrown during the operation of the sootblower to connect contacts S1C and S1B, coil A will be energised. This will energise coil F so that mains power contactor PE is de-energised to stop the outward motion of the sootblower and mains power contactor PR is brought into operation to withdraw the sootblower. Thus inadvertent operation of the selector switch S1 merely curtails the operation of the sootblower without endangering it or stopping the sequence.

When motor M1 has brought the sootblower 1 back to its fully retracted position a further pulse will be generated by the limit switch LR1. This will reclose contacts T1 and again close contacts t1 and open contacts t2. Since T1 and t1 are both closed for the duration of the impulse, the coil of the time-delayed relay U will be energised to open contacts U2, close holding contacts U1 so that coil U will not cease to be energised when the impulse retaining t1 closed ceases, and close contacts U3. Closure of contacts U3 will energise distributor-operating solenoid O and the apparatus will then operate in the manner described when the push button PB was closed to move the pressure bar on to the next row of contacts.

The circuit described can be used for operating unidirectional sootblowers. These will be provided with only one limit switch LR1 and the first impulses from this will act in the way described to start the operation of the sootblower and the second impulse will act as described to move the pressure bar to the next row of contacts. In normal operation, the relay F would merely be "by-passed." However, some precaution must be provided against inadvertent operation of the sequence switch to "by-pass" during operation of the sootblower. If the sootblower were reciprocating, such an alteration to the sequence switch would merely retract the sootblower prematurely as described above. For unidirectional sootblowers, however, its effect would be to energise relay coil F to disconnect the main power contactor PE and connect into circuit mains power contactor PR. This reversal is undesirable and is prevented by contacts R1 of relay R, comprising two coils RC1 and RC2. By means of relay R it is possible to use the apparatus shown to control a mixture of the unidirectional and retractable sootblowers. Suppose, for instance, that the rows of contacts CX—CY are to be used for controlling retractable sootblowers whilst the rows of contacts before and after these rows are used for unidirectional sootblowers. Then relay coil RC1 is connected through lead $x$ to contact 7C$b$X and relay coil RC2 is connected through lead $y$ to contact 7C$b$(Y+1). When the pressure bar lies along contacts X coil RC1 will be energised to close contacts R1 so that relay coil F can become energised. When the pressure bar lies along contacts Y+1, coil RC2 will be energised to open contacts R1 and so disconnect coil F.

Of the apparatus shown in Figure 5 the relay H and the alarm circuit remain to be described.

Relay coil H controls contacts H1 and is in turn energised through leads H$a$ or H$b$ only when steam is being supplied to the sootblower. Which of these leads is used depends upon whether the sootblower is unidirectional or reciprocating. For unidirectional sootblowers, contacts R2 are held in the position shown and lead H$a$ is used. For reciprocating sootblowers, contacts R2 are switched to their other position and lead H$b$ is used.

When steam is being supplied to the sootblower, coil H is energized and contacts H1 are in the position shown in Figure 5 so that operation of the sootblower is possible. If no steam is being supplied, contacts H1 lie in their alternative position; energisation of relay J will not be able to start the motor M1 through the mains power contactor coil PE.

If the steam is cut off during operation of the sootblower, the operation will be completed through the holding contacts E2 but the sequence will come to rest when the pressure bar has moved on to the next succeeding row of contacts on the distributor. Contacts H1 are, however, such that when in their alternative position, and the sootblowers are of the reciprocating type they will energise the relay coil F, through the closed holding contacts E2, and so immediately inaugurate the return movement of the sootblower.

The alarm circuit is shown at AA. It comprises a warning lamp AL connected on one side to neutral and on the other through the voltage dropping resistor AR, contacts G1, T2, PR6 and PE6 and the fuse AF to the output side of the isolating switch fuse IF3. Also connected between the fuse AF and neutral are the test push button APB and the coil AC which controls the contacts AC1. Lamp AH is connected through switches PE5 and PR5 between neutral and the power line and serves to indicate at the alarm device whether a sootblower is operating or not.

AT$a$ and AT$b$ are the synchronous motors of two timing devices similar to those described with reference to Figure 4 arranged to produce a signal if a sootblower does not complete its operation within a predetermined time. When contacts R3 are in the condition shown, AT$a$ is connected between neutral and the switches PR4 and PE4 to the fuse AF and AT$b$ is disconnected. When contacts R3 are in their alternative condition, i.e. when the sootblowers are of the reciprocating type, AT$b$ is similarly connected and AT$a$ is disconnected. The timing devices are such that if they are still energised after a predetermined time for which they are set, contacts AT$a$1, or AT$b$1, will be thrown to their alternative conditions and connect the audible warning Klaxon AK into circuit through the contacts AC1.

A flash-relay Q is connected between G1 and neutral.

To test the alarm circuit, push button APB is depressed. This energises coil AC to disconnect AK (so that no audible signal will be given) and connect lamp AL into circuit so that it will give its visible warning.

Now suppose the pressure arm of the distributor lies along a row of contacts for which the sequence switch S is set to the "operating" condition. Contacts T2 will be closed for this period and either contacts PE6 or PR6 will be open except for the duration of the delay resulting from coil G and during this delay contacts G1 are open. Thus, during normal operation, lamp AL and Klaxon AK will be out of circuit. Should one of the phases of the main supply develop a fault, however, one of the coils PSC1, PSC2 and PSC3 will become de-energised, open its corresponding contacts and so de-energise the main power contactor coil PE or PR. Contacts PE6 and PR6 will thus both be closed simultaneously and the lamp AL and Klaxon AK will operate, also flasher coil Q will be energised so intermittently interrupting the supply to lamp B$n$ through contacts Q1 and so indicating the sootblower at which the fault has occurred. The alarm device thus gives warning of a phase failure.

In a similar way, if the main switches MS1, MS2 and MS3 are opened during operation of a sootblower, a warning will be produced.

Now as soon as either of the mains power contactor coils is energised, corresponding switch PE4 or PR4 is closed to connect either timing motor AT$a$ or timing motor AT$b$ (depending upon the condition of R3) into circuit. This sets the devices to throw the corresponding contacts AT$a$1 or AT$b$1 to their alternative positions, if they have not been de-energised beforehand, at a predetermined time after they have been set. This time is slightly greater than the normal operating time of the corresponding sootblower and the need to have one timing motor (AT$a$) for unidirectional sootblowers and another (AT$b$) for reciprocating sootblowers results from the widely different normal operating times of these sootblowers.

If the sootblower completes its operation in the normal time, switches PE4 and PR4 are both opened so that the timing motor is de-energised before it operates an alarm. If one of these switches is still closed, however, at the end of the period for which the timing device is set, the corresponding contacts AT$a$1 or AT$b$1 will be switched to their alternative positions connecting the lamp AL, the Klaxon AK and the flasher coil Q in circuit 6 to indicate a fault.

The circuit shown in Figure 5 can be adapted to suit various special conditions. For instance, it may be desired that every row of contacts on the distributor should be employed to control a sootblower motion. In this case, the circuit shown in Figure 6 may be incorporated in the circuit associated with the first sootblower.

A starting relay SR is incorporated and provided with contacts SR1 and SR2, holding contacts SR3 and switching contacts SR4. Contacts SR1 and SR2 are included in the connections between terminals S1B and S1S of the sequence switch S1 and contacts 6C$b$1 and 5C$b$1 of the distributor. Contacts SR1 and SR2 are normally open so that when the pressure bar has moved from the last row of contacts CL of the distributor D to the first row of contacts C1, the sequence of operation will end. Lamp BB will light through contacts E4 and SR5 in their shown positions to indicate this. When contacts E4 and SR5 are in their alternative positions lamp B1 will light during operation in the normal way through flasher contacts Q1. (Contacts E4 correspond to contacts E4 in Figure 5.)

Additional contacts V3 are provided on relay V and when these are closed relay coil SR is energised through contacts V3. The holding current for relay coil SR flows through contacts RR1 controlled by coil RR which is arranged to be energised when operating solenoid O is energised.

To start the cycle of operations, press button PB is closed. This energises coil SR closing contacts SR1 and SR2, so that the sequence switch S1 is connected in circuit, and closing SR3 so that a holding current flows through coil SR. The apparatus will then operate in the normal way to operate the first sootblower and then move the pressure bar to the second row of contacts after which the cycle will proceed normally. When the solenoid O is energised to move the pressure bar to the next row of contacts, coil RR is simultaneously operated. This opens contacts RR1, releasing relay SR so that it will be open when the pressure bar regains the first row of contacts C1 on the distributor D.

The circuit shown in Figure 5 can be used if two groups of sootblowers I and II respectively are to be operated in what is known as the double-blowing technique in which each sootblower of each group is operated simultaneously with a sootblower of the other. A circuit such as is shown in Figure 5 must be provided for each group of sootblowers. To ensure that the sootblower of one group cannot operate before the preceding sootblower of the other group has completed its operation, the circuits are interconnected as shown in Figure 7. Contacts IU3 of one group of sootblowers are connected in series with the contacts IIU3 of the other group and the operating solenoids IO and IIO of the two groups are connected in parallel. Energising current can then pass to the solenoids only when both contacts IU3 and IIU3 are closed.

It may happen that although double blowing is required for some of the sootblowers of each group, the additional steam requirements of some of the sootblowers are such that some of each group must be operated singly and then the corresponding sootblowers of the other group must be operated singly. To provide for this the circuit shown in Figure 8 is incorporated in that shown in Figure 5. The circuit is appropriate if sootblowers in group I are to be operated singly before sootblowers in group II.

This circuit includes relays IR and IIR. Relay IR comprises a trip coil IRT and a reset coil IRS and contacts IR1, IR2, IR3, IR4, and IR5. Relay IIR comprises trip coil IIRT and a reset coil IIRS and contacts IIR1, IIR2, IIR3, IIR4 and IIR5. A relay DN having contacts DN1, DN2 and DN3 is also provided.

Contacts IR1 are connected to $a1$—$a2$ of the circuit shown in Figure 5 associated with group I of the sootblowers. Contacts IIR1 are connected to $a1$—$a2$ of the circuit shown in Figure 5 associated with group II of the sootblowers. Contacts IU3 of the circuit shown in Figure 5 associated with group I of the sootblowers is in series with the contacts IIU3 of the circuit shown in Figure 5 associated with group II of the sootblowers. Points $b1$ and $b2$ are common to both circuits and the contacts IR2 are connected between them. Points $c1$ and $c2$ are also common to both circuits and the contacts IIR2 are connected between them.

Operating solenoid IIO is connected in parallel with the series connected solenoid IO and contacts IR4 and IIR4. One end of the parallel connection goes to neutral and the other to the output end of contacts IIU3. The mid-point of the contacts IR4 and IIR4 is connected to the relay coil DN in parallel with solenoid IO and contacts IR4. This mid-point is also connected through contacts IR3 and IIR3 in series to the power line. The power sides of contacts IIR2 and IIR3 are commoned.

Now suppose single blowing is to start with sootblower X and end after the operation of sootblower Y. The trip coil IIRT is connected on one side to neutral and on the other through contacts DN3 to contact $7CbX$ on distributor ID which controls group I of sootblowers. Trip coil IRT is connected on one side to neutral and on the other through contacts IIR5 and DN2 to $7Cb(Y+1)$ on distributor ID. Reset coil IIRS is connected on one side to neutral and on the other side through contacts IR5 to $7Cb(Y+1)$ on distributor ID and reset coil IRS is connected on one side to neutral and on the other side through contacts DN1 to $7Cb(Y+1)$ on distributor IID.

In operation of the apparatus, double blowing will occur through the parallel connected operating solenoids IO and IIO until the pressure arms of the distributor ID and IID lie along the row of contacts X. Then a current from contact $I7CbX$ on distributor ID will energise coil IIRT. This will open contacts IIR1 ensuring that the mains power contactor coil of group II cannot operate and open contacts IIR2 and IIR4 to disconnect contacts IIU3 and operating solenoid IIO. Contacts IIR3 will close so that solenoid IO is connected to the power line through these contacts and contacts IR2. Contacts IIR5 will also close. The circuit is then in a condition in which the sootblowers X to Y of group I can be operated without sootblowers X to Y of group II being operated.

As soon as the pressure bar moves from the last row of contacts (Y) on distributor ID and makes contact in the row Y+1, current passes from contacts $17Cb(Y+1)$ through contacts DN2 and IIR5 (which were closed by the energisation of IIRT) to energise IRT. This moves the contacts IR1, IR2, IR3, IR4 and IR5 into positions similar to those occupied respectively by IIR1, IIR2, IIR3, IIR4, and IIR5 and allows operating solenoid IIO to function in a similar way. At the same time closure of contacts IR5 allows current to flow through coil IIR from $17Cb(Y+1)$ to restore the contacts of relay IIRS and so allow solenoid IIO to operate whilst solenoid IO is inoperative.

When pressure bar on distributor IID reaches the row of contacts (Y+1) current flows through contacts II7Cb(Y+1) to energise coil IRS and so leave the circuit in the condition shown in which double blowing can be resumed.

Relay DN is energised each time one of the operating solenoids is energised and its purpose is to break the circuits to the coils IRT, IRS, IIRT, and IIRS so that the relays IR and IIR do break the operating solenoid circuits whilst the solenoids are still energised.

If double blowing is to be used with distributors on which all the rows of contacts are used, the relay coil SR shown in Figure 6 can be arranged to break the leads to sequence switch 1 of the circuits associated with each group of sootblowers.

It may happen that more rows of contacts are required than can be incorporated on one distributor and an arrangement for automatically transferring from distributor I to distributor II is shown in Figure 9.

The operating solenoid of distributor I, IO, and the associated contacts IO1 and IO2 are connected into circuit in the same way as the operating solenoid O and associated contacts O1 and O2 shown in Figure 5. Solenoid IIO and the associated contacts IIO1 and IIO2 of distributor II are connected in parallel with the solenoid and contacts of distributor I through contacts SR1, SR2, SR3 and SR4 of additional relay SR, the condition of these contacts determining whether distributor I or distributor II is connected in circuit. When contacts SR2 are closed relay coil PR is connected in parallel with operating solenoid IIO.

All the $b$-contacts of the last row CL of contacts on distributor I are connected to the commoned contacts of distributor II. On distributor II, contacts $1CbL$ to $5CbL$ are unused. Contact $6CbL$ is connected to the power line through contacts SR6 and contacts TR1 on an additional relay TR. This is a time-delayed relay and is connected on one side to neutral and on the other to the power line through contacts SR5.

Relay SR comprises a reset coil SRR and a trip coil SRT. Contact $7CbL$ on distributor I is connected not only to $7Ca$ on distributor II but also through contacts PR1 and QR1, of relay QR, to the reset coil SRR and so to neutral. Contact $7CbL$ of distributor II is connected through contacts TR2 and contacts PR2, to the relay coils QR and SRT in parallel and so to neutral.

Now when the pressure bar on distributor I reaches its last row of contacts, it connects these contacts to the commoned contacts on the distributor II. It also energises coil SRR through contacts PR1 and QR1 to move switches SR1, SR2, SR3 and SR4 to switch the solenoid IO and contacts IO1 and IO2 out of circuit and solenoid IIO and contacts IIO1 and IIO2 into circuit. It also closes contacts SR5, through which time-delayed relay coil TR is energised, and contacts SR6. During the delay both contacts SR6 and TR1 are closed so that an impulse will pass through the contacts on the distributors to relay coil A (Figure 5), which is connected to 6Ca of distributor I, and so energise solenoid IIO. This will move the pressure arm on distributor II on to the first row of contacts. Simultaneously with the energisation of solenoid IIO, relay PR will be energised, opening contacts PR1 and PR2. By the time relay TR becomes operative to throw its contacts, PR2 will be open so that coils QR and SRT cannot be energised. However, when the pressure arm of distributor II has closed all the rows of contacts on this distributor in turn and returned to row CL, coil PR will be de-energised when coil IIO has become de-energised after moving the pressure arm to this last position. PR2 and TR2 will therefore be closed simultaneously to energise coils QR and SRT. Energisation of the latter will restore the contacts of relay SR to the condition in which they are shown in the drawing whilst energisation of the former will open contacts QR1 to ensure that SRR cannot be immediately energised again to cause the next coil to operate again. Moreover, since contacts SR6 are open an impulse cannot be applied to relay coil A (Figure 5) to start the distributor I in operation again.

It will be realised that the change from distributor I to distributor II could occur before the last row of contacts on distributor I is reached and if, in these circumstances, it were desired to use the remaining rows of contacts of distributor I after distributor II had completed its operation, contacts SR6 could be eliminated so that a direct connection existed between contacts TR1 and the power line. Distributor I would then automatically complete its operation after distributor II had been exhausted.

I claim:

1. Control apparatus comprising a distributor having several operational positions, a plurality of sootblower-operating electric motors, a mains switch, circuit means including circuit breakers connecting each of the motors to the mains switch, means associated with each operational position of the distributor for controlling the condition of the circuit breakers, means including a solenoid for automatically adjusting the distributor from one operational setting to another, means whereby the solenoid opens the mains switch immediately upon energisation and subsequently adjusts the distributor position, a selector switch for each operational position of the distributor and a circuit, including the selector switch, adapted when the selector switch associated with any distributor position is in one condition to energise the solenoid when the distributor is adjusted to that position so that the mains switch cannot close and adapted, when said selector switch is in another condition, to energise the solenoid only after the motor, or motors associated with that position have completed their operation.

2. Control apparatus comprising a distributor having several operational positions, a plurality of sootblower-operating electric motors, a mains switch, solenoid operated means for controlling the mains switch, circuit means including circuit breakers connecting each of the motors to the mains switch, means associated with each operational position of the distributor for controlling the condition of the circuit breakers, circuit means for energising the solenoid operated means when the distributor is adjusted to one of its operational positions to close the mains switch, de-energising the solenoid operated means to open the mains switch when the operation associated with that operational position has been completed and subsequently automatically causing the distributor to be adjusted to its next operational position.

3. Control apparatus comprising a distributor having several operational positions, a selector switch associated with each operational position, a plurality of sootblower-operating electric motors, a mains switch, solenoid operated means for controlling the mains switch, circuit means including circuit breakers connecting each of the motors to the mains switch, means associated with each operational position of the distributor for controlling the condition of the circuit breakers and circuit means which for each operational position of the distributor includes the solenoid operated means for controlling the mains switch and the selector switch corresponding to that operational position, the circuit means being arranged when the selector switch is in one position to energise the solenoid operated means to close the mains switch, de-energize the solenoid operated means to open the mains switch when the operation associated with that operational position has been completed and subsequently automatically adjust the distributor to its next operational position and when the selector switch is in another position to automatically adjust the distributor to is next operational position without first closing the mains switch.

4. Control apparatus comprising a distributor having several operational positions, a plurality of sootblower-operating electric motors, a reversible mains switch, circuit means including circuit breakers connecting the motors to the mains switch in such a way that on reversal of the mains switch the mottors will be driven in the reverse direction, means associated with each operational position of the distributor for controlling the condition of the circuit breakers, solenoid operated means for controlling the mains switch, circuit means for energising the solenoid operated means when the distributor is adjusted to one of its operational positions to close the mains switch, subsequently to reverse the mains switch and subsequently to open the mains switch.

5. Control apparatus as claimed in claim 4, in which, after the mains switch has been opened the distributor is automatically moved to its next operational position.

6. Control apparatus comprising a distributor having several operational positions, a plurality of sootblower-operating electric motors, a mains switch, circuit means including circuit breakers connecting each of the motors to the mains switch, means associated with each operational position of the distributor for controlling the condition of the circuit breakers, means for operating the circuit breakers only when the mains switch is open, circuit means adapted to cause the distributor when adjusted to any but the last of its operational positions to be adjusted automatically to the next and including a manually operable switch which can be closed when the distributor is in its last operational position to be adjusted to the first operational position.

7. Control apparatus comprising two distributors each having the same number of operational positions, a plurality of sootblower-operating electric motors associated with each distributor, a mains switch associated with each distributor, circuit means including circuit breakers connecting each of the motors to the mains switch with which it is associated, means associated with each operational position of each distributor for controlling the condition of the associated circuit breakers, means for operating the circuit breakers only when the mains switches are closed, means for automatically adjusting each distributor from one operational position to the next and means for ensuring that neither distributor can be adjusted from one position to the next unless the other is simultaneously so adjusted.

8. Control apparatus comprising two distributors each having the same number of operational positions, a plurality of sootblower-operating electric motors associated with each distributor, a mains switch associated with each distributor, circuit means including circuit breakers connecting each of the motors to the mains switch with which it is associated, means associated with each operational position of each distributor for controlling the condition of the associated circuit breakers, means for operating the circuit breakers only when the mains switches are closed, means for automatically adjusting each of the distributors from each operational position to the next, means for ensuring that for a certain range of the operational positions one distributor cannot be adjusted from one operational position to the next unless the other distributor is simultaneously adjusted from the corresponding operational position to the next and means for ensuring that for a certain other range of the operational positions, one of the distributors is adjusted through that range of positions whilst the other is stationary and then that distributor is stationary whilst the other distributor is adjusted through that range of positions.

9. Control apparatus comprising two distributors each having a number of operational positions, a plurality of sootblower-operating electric motors associated with each distributor, a mains switch, circuit means including circuit breakers connecting each of the motors to the mains switch, means associated with each operational position of each distributor for controlling the condition of the circuit breakers, means for operating the circuit breakers only when the mains switch is closed, means for automatically adjusting one distributor through a certain range of its operational positions whilst the other distributor is stationary and then automatically adjusting the other distributor through a certain range of its operational positions whilst the first distributor is stationary.

10. Control apparatus comprising a distributor having several sets of pairs of contacts, a mains switch, several sootblower-operating electric motors each connected through the contacts of a set of contacts on the distributor to the mains switch, a plurality of selector switches associated one with each of the sets of contacts, a mains switch operating solenoid adapted to be energised through a pair of contacts of each set when the corresponding selector switch is in an appropriate setting, solenoid operated relay means arranged on energisation to open one set of contacts and close the next, circuit means energising said solenoid operated relay means through one pair of contacts in each set when the selector switch is in an appropriate condition different from said aforementioned condition, means responsive to the completion of the operation of each electric motor associated with the set of contacts and further means associated therewith to de-energise the mains switch operating solenoid and complete the circuit means energising the solenoid operated relay means when the operation of the electric motor has been completed.

11. Control apparatus as claimed in claim 10, in which the solenoid operated relay means includes a switch which opens to de-energise the mains switch operating solenoid, the solenoid operated relay means being arranged first to open said switch and then to open the set of contacts on the distributor before closing the next set.

12. Control apparatus comprising a distributor having several sets of pairs of contacts, a reversing mains switch, several three-phase sootblower-operating electric motors each connected through the contacts of a set of contacts on the distributor to one position of the mains switch and each additionally connected through the same set of contacts on the distributor to the other position of the mains switch, a plurality of selector switches associated one with each of the sets of contacts, two mains switch operating solenoids of which one is adapted to be energised thorugh a pair of contacts of each set when the corresponding selector switch is in an appropriate setting, solenoid operated relay means arranged on energisation to open the mains switch and subsequently to open one set of contacts on the distributor and close the next, circuit means energising the solenoid operated relay means through one pair of contacts in each set when the selector switch is in an appropriate condition different from said aforementioned condition, means responsive to the completion of one operation of the electric motor associated with the set of contacts, further means associated therewith to de-energise the mains switch operating solenoid that was energised and to energise the other mains switch operating solenoid to reverse the mains switch, means responsive to the completion of the further operation of said electric motor and further means associated therewith to de-energise the second mains switch operating solenoid and complete the circuit means energising the solenoid operated relay means when the second operation of the electric motor has been completed.

13. Apparatus for controlling the operation in sequence of a plurality of sootblower-operating electric motors comprising a distributor having a plurality of sets of contacts, a common mains switch, a plurality of sootblower-operating electric motors connected to the common mains switch through each of the sets of contacts, electrically operated means for closing each set of contacts, subsequently opening that set of contacts and closing the next, means whereby the current required to operate the means to open the set of contacts is supplied through said contacts, a manually operable switch adapted to interrupt the supply of current to the first set of contacts unless manually operated and a relay coil adapted to maintain current to the first set of contacts after the manually operable switch has been closed until that set of contacts has been opened.

14. Apparatus for controlling the operation in sequence of two groups of sootblower-operating electric motors comprising two distributors each having a plurality of sets of contacts, two common mains switches associated one with each distributor the electric motors of one group being connected to one of the mains switches through the sets of contacts of one distributor, the electric motors of the other group being connected to the other mains switch through the sets of contacts of the other distributor, two electrically operated means associated one with each of the distributors for closing each set of contacts, subsequently opening that set of contacts and closing the next, a lead through which current is supplied to both electrically operated means, two switch means in said lead associated one with each of the distributors and means responsive to the end of the operation of any motor associated with any set of contacts of either distributor to close the switch means associated with that distributor when said operation has ended.

15. Apparatus for controlling the operation in sequence of two groups of sootblower-operating electric motors comprising two distributors each having a plurality of sets of contacts, two common mains switches associated one with each distributor, the electric motors of one group being connected to one of the mains switches through the sets of contacts of one distributor, the electric motors of the other group being connected to the other mains switch through the sets of contacts of the other distributor, two electrically operated means associated one with each of the distributors for closing each set of contacts, subsequently opening that set of contacts and closing the next, means whereby each of the electrically operated means can be rendered operative and inoperative, and means whereby when a given set of contacts of one distributor is closed the electrically operated means associated with the other distributor is rendered operative, when a given other set of contacts on said distributor is closed the electrically operated means associated with said distributor is rendered inoperative and the electrically operated means associated with the other distributor is rendered operative, and when a given other set of contacts on said other distributor is closed the electrically operated means associated with said first distributor is rendered operative again.

16. Apparatus for controlling the operation in sequence of a group of sootblower-operating electric motors comprising two distributors each having a plurality of sets of contacts, a common mains switch, means connecting certain of the motors to the mains switch through the sets of contacts of one of the distributors, means connecting the other motors to the sets of contacts of the other distributor, means connecting each row of contacts on the other distributor to a transfer row of contacts on the first distributor, means for automatically closing each set of contacts on the first distributor and subsequently opening that set of contacts, and closing the next set, means for automatically closing each set of contacts on the other distributor and subsequently opening that set of contacts and closing the next set and means whereby when the transfer set of contacts on the first distributor is closed, the first set of contacts on the second distributor is automatically closed.

17. Control apparatus comprising a distributor having several operational positions, selector means for adjusting the distributor from one operational position to another in sequence, a plurality of contact breakers and means for selectively closing the contact breakers according to the setting of the selector means, a plurality of sootblower-operating electric motors, a heavy duty switch, circuit means interconnecting the circuit breakers, the heavy duty switch and the motors so that in each operational position of the distributor one of the motors is connected through the circuit breakers to the heavy duty switch, locking means adapted to prevent operation of the contact breakers whilst the locking means is actuated, and means for maintaining the locking means in its actuated condition whilst the heavy duty switch is closed.

18. Control apparatus comprising a distributor having a supporting body, a plurality of pairs of switch contacts carried by the body and being aligned in straight rows extending lengthwise of the body and in circles, having the same diameter and centres lying on a common axis, which encircle the body, a pressure bar extending lengthwise of the straight rows of contacts and closing all the contacts of the straight row, means for moving the pressure bar to close the contacts in each of the other straight rows sequentially, a plurality of sootblower-operating electric motors, a heavy duty switch, circuit means connecting each motor to the heavy duty switch through the switch contacts of one of the straight rows, locking means adapted to prevent movement of the pressure bar whilst the locking means is actuated, and means for maintaining the locking means in its actuated condition whilst the heavy duty switch is closed.

19. Control apparatus as claimed in claim 18 in which the contacts all extend tangentially of the circles on which they lie, each contact has a free end and a fixed end and the free ends of all the contacts lie in the same direction, circumferentially of the fixed ends, and the means for moving the pressure bar is such as to move the bar in the direction in which the free ends lie relatively to the fixed ends.

20. Control apparatus as claimed in claim 18 in which the contacts all extend tangentially of the circles on which they lie, each contact has a free end and a fixed end and the free ends of all the contacts lie in the same direction, circumferentially of the fixed ends, the pressure bar includes two beams mounted side-by-side and the outermost contact of each pair is provided with a hump which lies between the beams when the pressure bar is in contact-closing position, and the means for moving the pressure bar is such as to move the bar in the direction in which the free ends lie relatively to the fixed ends.

21. Control apparatus as claimed in claim 18 in which the pressure bar is connected to a ratchet wheel, a pivoted bar is provided with a pawl cooperating with the ratchet wheel and a solenoid is provided to move the bar on energization, the movement of the bar produced by energization of the solenoid being such as to move the pressure bar from one contact-closing position to another.

References Cited in the file of this patent

UNITED STATES PATENTS

| | | |
|---|---|---|
| 2,144,033 | Root | Jan. 17, 1939 |
| 2,511,821 | Bullard | June 13, 1950 |
| 2,536,256 | Berg | Jan. 2, 1951 |